United States Patent [19]

Nieczyporowicz

[11] Patent Number: 5,186,033
[45] Date of Patent: Feb. 16, 1993

[54] APPARATUS AND METHOD FOR FORMING EXTERNAL RAISED BEADS ON HOLLOW TUBING

[75] Inventor: Alex Nieczyporowicz, Torrance, Calif.

[73] Assignee: Earl's Supply Co., Long Beach, Calif.

[21] Appl. No.: 804,887

[22] Filed: Dec. 6, 1991

[51] Int. Cl.$^5$ ............................................. B21B 27/06
[52] U.S. Cl. ........................................ 72/75; 72/123
[58] Field of Search ................... 72/122, 123, 118, 75

[56] References Cited

U.S. PATENT DOCUMENTS

| 2,375,235 | 5/1945 | Maxwell | 72/123 |
| 3,670,547 | 6/1972 | Granger | 72/123 |
| 4,759,237 | 7/1988 | Fauchet et al. | 72/75 |

Primary Examiner—W. Donald Bray
Attorney, Agent, or Firm—Poms, Smith, Lande & Rose

[57] ABSTRACT

Apparatus and method for forming external raised beads on hollow rigid tubing. The apparatus includes an adjusting screw threadably mounted into a threaded body member having one or more balls mounted in apertures in the body member. The body member is inserted into one end of the hollow tubing, the balls being disposed inside of the body member between a reduced diameter portion of the screw and the inner wall of the body member. When the screw is threaded into the body member, the balls are forced outwardly against the inner wall of the tubing forming a raised bead on the exterior of the tubing. Continued rotation of the screw and body member increases the height of the bead.

18 Claims, 2 Drawing Sheets

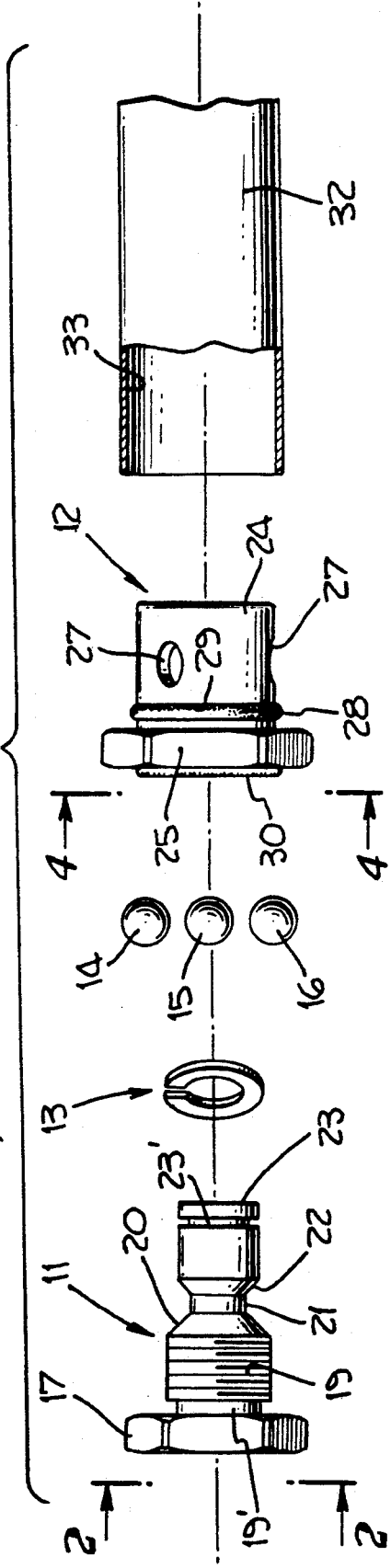
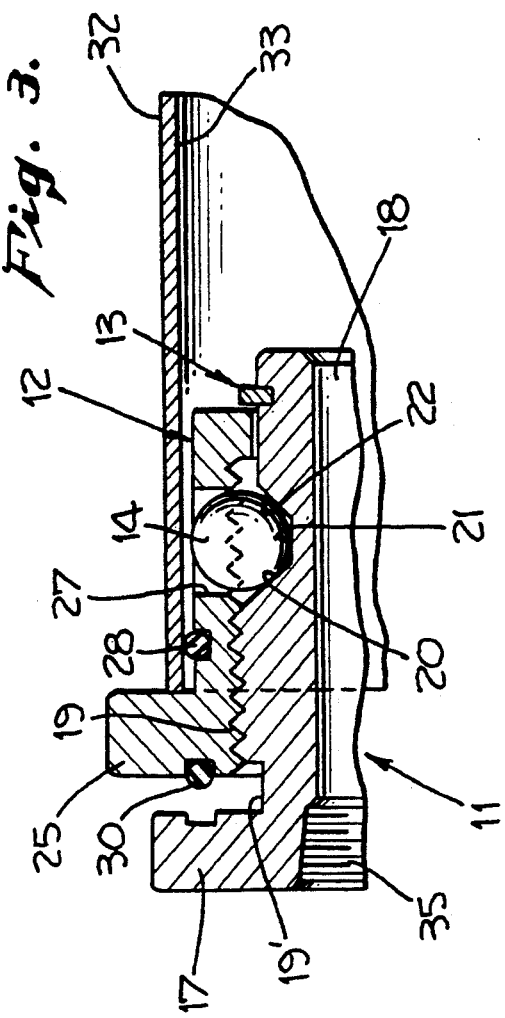
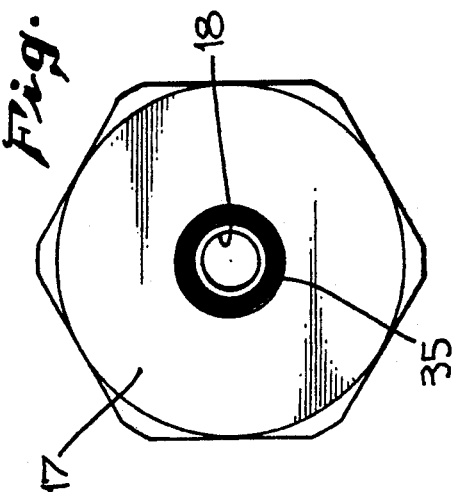

APPARATUS AND METHOD FOR FORMING EXTERNAL RAISED BEADS ON HOLLOW TUBING

BACKGROUND OF THE INVENTION

1. Field of the Invention

The invention relates to tools for forming beads on hollow tubing; and, more particularly, to apparatus and method for forming a raised bead on the exterior of a hollow tubing.

2. Description of the Prior Art

Hoses or other tubing carrying fluids have many uses. Generally, such rigid tubing can be fluidly coupled to another rigid tubing using clamps or the like. Ridges or beads may be formed on the outside surface of such tubing to assist in retaining the clamp onto the tubing. That is, the clamp is provided about the tubing between the ridge or bead and the unattached end of the tubing. In this manner, the clamp cannot slide off of the tubing past the ridge or bead.

Such ridges or beads must be preformed on the tubing. There is a need for a relatively simple tool for quickly and easily forming such ridges or beads, to a predetermined height, in situ.

SUMMARY OF THE INVENTION

It is an object of this invention to provide a tool for forming a bead in hollow rigid tubing in situ.

It is a further object of this invention to provide such a tool which can form an annular raised bead on the external surface of the tubing to a predetermined height.

These and other objects are preferably accomplished by providing a tool adapted to form external raised beads on hollow rigid tubing. The apparatus includes an adjusting screw threadably mounted into a threaded body member having one or more balls mounted in apertures in the body member. The body member is inserted into one end of the hollow tubing, the balls being disposed inside of the body member between a reduced diameter portion of the screw and the inner wall of the body member. When the screw is threaded into the body member, the balls are forced outwardly against the inner wall of the tubing forming a raised bead on the exterior of the tubing. Continued rotation of the screw and body member increases the height of the bead.

BRIEF DESCRIPTION OF THE DRAWING

FIG. 1 is an exploded view of a tool in accordance with the teachings of the invention adapted to be inserted into a section of hollow rigid tubing;

FIG 2 is a view taken along lines 2—2 of FIG. 1;

FIG. 3 is an assembled cross-sectional view of the tool and tubing of FIG. 1 prior to formation of a bead on the tubing;

DESCRIPTION OF THE PREFERRED EMBODIMENT

Figure 4:
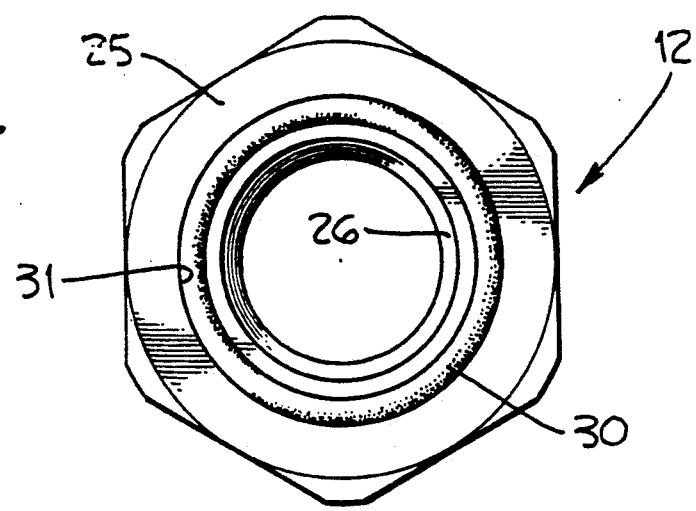
FIG. 4 is a view taken along lines 4—4 of FIG. 1.

Referring now to FIG. 1 of the drawing, tool 10 includes an adjusting screw 11, a threaded body member 12, a spring clip 13 and a plurality of balls, such as three balls 14 to 16.

Screw 11 includes an outer hex-shaped nut head 17 (FIG. 2) with an inner cavity 18. Screw 11 also includes a threaded portion 19 (FIG. 1) separated from head 17 by a cylindrical portion 19'. A generally smooth-surfaced tapered portion 20 extends from threaded portion 19 to a lesser diameter cylindrical portion 21 forming a neck between threaded portion 19 and a second tapered portion 22 leading to nose 23. Nose 23 is generally cylindrical and has an external groove 23' adapted to receive therein snap ring 13. Thus, as seen in FIG. 3, ring 13 snap fits into groove 23' and provides a stop so that screw 11 cannot be removed from body member 12.

As seen in FIG. 1 body member 12 has a generally cylindrical main body portion 24 having hex-shaped nut head 25 (see also FIG. 4) and a threaded throughbore 26 through head 25 and main body portion 24. A plurality of holes 27, such as three, are provided through main body portion 24 generally equally spaced thereabout. The number of holes 27 corresponds to the number of balls 14 to 16; obviously less than three or more than three may be provided.

A resilient O-ring 28 is mounted in an annular groove 29 on the exterior of main body portion 24 adjacent nut head 25. A like resilient O-ring 30 is mounted in a groove 31 in nut head 25 surrounding throughbore 26 (FIG. 4).

Tubing 32 is shown in FIG. 1 as hollow and of an inner diameter generally related to the outer diameter of main body portion 24 so that the tubing 32 may be slid over onto main body portion 24 as shown in FIG. 3.

In assembly of the parts of FIG. 1, referring to FIG. 3, O-rings 28 and 30 are placed in grooves 29 and 31, respectively. Balls 14–16 are inserted into the throughbore of main body portion 24 into holes 27 (the outer surface of each hole 27 may be peened, as is well known in the art, to prevent balls 14 to 16 from exiting out of holes 27). Screw 11 is now threaded into threaded throughbore 26 of body member 12 to the position shown in FIG. 3. Snap ring 13 is now snapped into groove 23' to retain screw 11 to body member 12.

As seen in FIG. 3, balls 14 to 16 are disposed between the neck 21 of screw 11 and each respective hole 27. Thus, tubing 32, which is a rigid piece of tubing, such as aluminum, is now slid over onto body member 12 as shown in FIG. 3.

Figure 5:
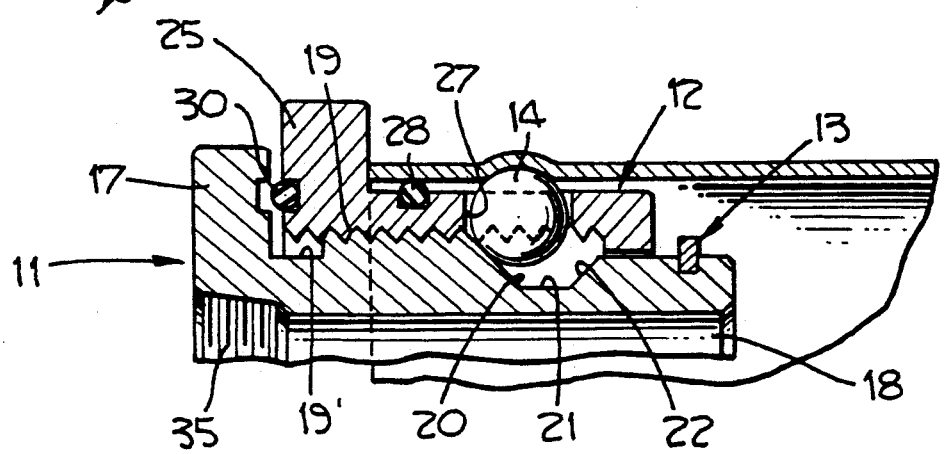
FIG. 5 is a view similar to FIG. 3 showing the beginning formation of a bead on the exterior of the tubing.
Figure 6:
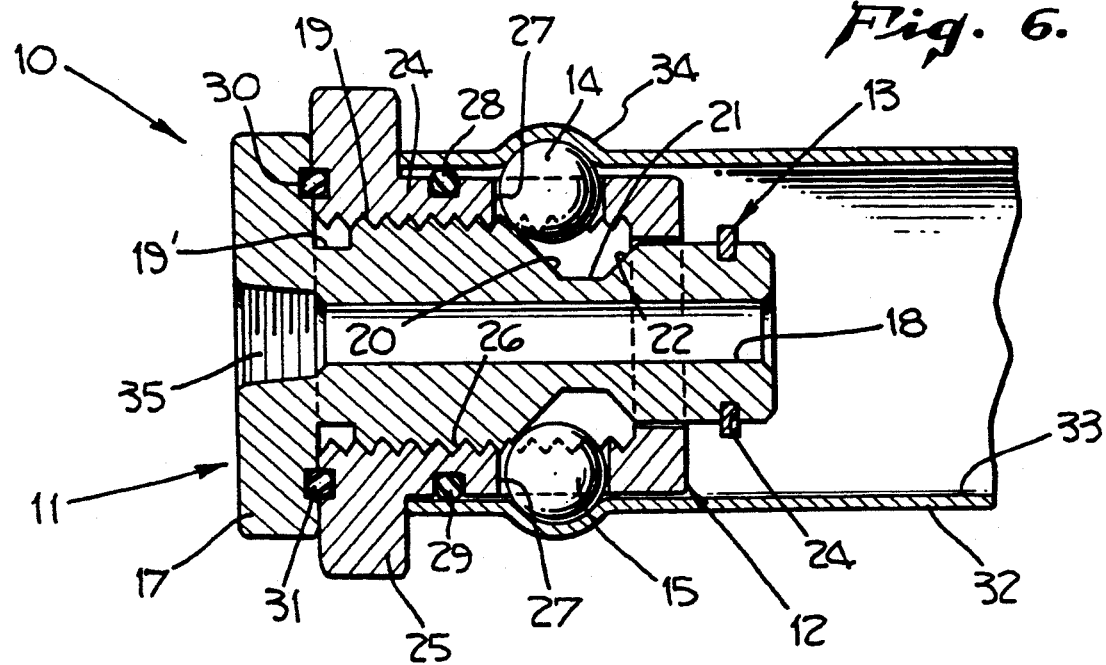
FIG. 6 is a view similar to FIG. 5 showing the final position of the parts of the tool of FIG. 1 after formation of a bead on the exterior of the tubing.

Screw 11 is now threaded into body member 24, tapered portion 20 engaging balls 14 to 16 and pushing them outwardly against the inner wall 33 of tubing 33 as seen in FIG. 5. Rotation of screw 11 and body member 24 together is continued until the desired height of the bead is formed on the exterior of tubing 32, as seen by annular bead 34 in FIG. 6.

O-rings 28, 30 and their respective grooves may be eliminated if tool 10 is used merely to form a bead in tubing 32. That is, a tool 10 can be used to form a bead, as heretofore discussed, in tubing 32 without need of O-rings or the like. However, the use of O-ring 28 and groove 29 seals tubing 32 in a fluid tight manner to body member 12. The use of O-ring 30 and groove 31 on the head 17 of screw 11 allows tool 10 to be used as a liquid tight plug.

Fluid may be introduced into throughbore 18 and thus into tubing 32 to test the tubing 32. This may be accomplished by providing a threaded port 35 (FIGS. 3, 5 and 6) leading into throughbore 24 into which a suitable threaded fluid tube attachment may be attached. Clip 13 prevents accidental disassembly of the screw 11 from body member 12.

It thus can be seen that I have disclosed a tool for forming or rolling raised ridges or beads around the exterior of rigid tubing to prevent a clamped hose from pulling off. That is, after the bead is formed, and a flexible hose is attached to the tubing, the hose is clamped to the tubing adjacent the bead and remote from the hose. The adjusting screw 11 is threaded into body member 12 pushing balls (or ball, if one is used—or any other suitable detent member) into contact with the interior of the tubing. Body member 12 is then rotated within the tubing to displace the material of the tubing outwardly forming a raised ridge or bead. After one or two revolutions of body member 12, adjusting screw 11 is threaded further into body member 12 forcing the balls or detents further out. The foregoing steps are repeated until the desired overall height of the bead is attained.

I claim:

1. A tool forming an external annular bead on a hollow rigid tube comprising:
   a screw having a main threaded portion of a first outer diameter, a head of a greater outer diameter than said threaded portion having an irregularly shaped outer configuration, a first tapered portion leading away from said threaded portion to a neck portion of a lesser outer diameter than the outer diameter of said threaded portion and a second tapered portion leading away from said neck portion to a nose portion of an outer diameter greater than the outer diameter of said neck portion;
   a body member having a main generally cylindrical body portion and an irregularly configured head of a greater outer diameter than the outer diameter of said body portion, said body member having an inner wall with a threaded throughbore extending through said body member, the threads of said throughbore adapted to threadably engage with the threads of said threaded portion of said screw, and at least one hole extending through said body portion opening into the interior thereof; and
   at least one detent of a size adapted to fit between said neck portion and the inner wall of said cylindrical portion when said screw partially threadably engages said body member and said at least one detent is aligned with said at least one hole whereby a hollow tubing having an inner wall and an outer wall and of an inner diameter substantially the same as the outer diameter of said cylindrical portion may be inserted onto said cylindrical portion and rotation of said screw further into said body member pushes said at least one detent further outwardly when said first tapered portion engages said at least one detent through said at least one hole against the inner wall of said tubing thereby forming a raised bead on the outer wall of said tubing.

2. In the tool of claim 1 wherein said at least one detent is a ball and said at least one hole is peened about the outer surface of said hole, the diameter of said hole being substantially same as the greatest outer diameter of said ball.

3. In the tool of claim 2 wherein three such balls and holes are provided, said holes being generally equally spaced about the periphery of said cylindrical portion.

4. In the tool of claim 1 including a resilient clip snap fitting into a groove in said nose portion.

5. In the tool of claim 1 including an annular groove provided about the periphery of said cylindrical portion adjacent the head of said body member, and a resilient O-ring disposed in said groove.

6. In the tool of claim 1 or 5 including an annular groove provided on the head of said body member surrounding said throughbore, and a resilient O-ring disposed in said last-mentioned groove.

7. In the tool of claim 1 including a throughbore extending through said screw.

8. In the tool of claim 7 including a port in the head of said screw opening into said last mentioned throughbore.

9. In the tool of claim 1 wherein said heads are hex shaped in outer configuration.

10. A method for forming an annular bead on a hollow rigid tubing including a screw having a main threaded portion of a first outer diameter, a head of a greater outer diameter than said threaded portion having an irregularly shaped outer configuration, a first tapered portion leading away from said threaded portion to a neck portion of a lesser outer diameter than the outer diameter of said threaded portion and a second tapered portion leading away from said neck portion to a nose portion of an outer diameter greater than the outer diameter of said neck portion, a body member having a main generally cylindrical body portion and an irregularly configured head of a greater outer diameter than the outer diameter of said body portion, said body member having an inner wall with a threaded throughbore extending through said body member, the threads of said throughbore adapted to threadably engage with the threads of said threaded portion of said screw, and at least one hole extending through said body portion opening into the interior thereof, at least one detent of a size adapted to fit between said neck portion and the inner wall of said cylindrical portion when said screw partially threadably engages said body member and said at least one detent is aligned with said at least one hole, the method comprising the steps of:
    threading said screw partially into said body member with said at least one detent disposed between said neck portion and the inner wall of said cylindrical portion and aligned with said at least one hole;
    inserting one open end of said hollow tubing having an inner and an outer wall over said cylindrical portion and over said at least one hole therein;
    partially rotating said screw into said body member until said first tapered portion engages said at least one detent forcing said at least one detent out of said at least one hole and against the inner wall of said tubing; and
    continuing rotation of said body member with respect to said screw thereby moving said at least one detent along said first tapered portion toward the threaded portion of said screw forcing said at least one detent against the inner wall of said tubing forming a bead on the outer wall thereof.

11. In the method of claim 10 wherein said at least one detent is a ball and the diameter of said hole is substantially same as the greatest outer diameter of said ball, and including the step of peening said hole to prevent said ball from exiting therefrom.

12. In the method of claim 11 including the step of providing three such balls and holes in said tool.

13. In the method of claim 10 including the step of forming a groove on the outer surface of said nose portion and snap fitting a resilient clip into said groove in said nose portion after said screw is threaded into said body member.

14. In the method of claim 10 including the step of providing an annular groove about the periphery of said cylindrical portion adjacent the head of said body member, and placing a resilient O-ring into said groove.

15. In the method of claim 10 including the step of providing an annular groove on the head of said body member surrounding said throughbore, and placing a resilient O-ring in said last mentioned groove.

16. In the method of claim 14 including the step of providing an annular groove on the head of said body member surrounding said throughbore, and placing a resilient O-ring in said last mentioned groove.

17. In the method of claim 10 including the step of providing a throughbore extending through said screw.

18. In the method of claim 17 including the step of providing a threaded port in the head of said screw opening into said last mentioned throughbore for coupling the threaded connection of a fluid conduit thereto, and subsequently checking the pressure of fluid flow through said tubing by flowing fluid under pressure through said port and into said tubing.

* * * * *